(12) United States Patent
Ishii (10) Patent No.: US 11,821,400 B2
(45) Date of Patent: Nov. 21, 2023

(54) CONTROL APPARATUS FOR VEHICLE (71) Applicant: TOYOTA JIDOSHA KABUSHIKI KAISHA, Toyota (JP)

(72) Inventor: Kenichi Ishii, Miyoshi-shi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/193,812

(22) Filed: Mar. 31, 2023

(65) Prior Publication Data

US 2023/0323846 A1 Oct. 12, 2023

(30) Foreign Application Priority Data

Apr. 7, 2022 (JP) .................................. 2022-064159

(51) Int. Cl.
*F02N 11/08* (2006.01)

(52) U.S. Cl.
CPC .... *F02N 11/0833* (2013.01); *F02N 2200/063* (2013.01); *F02N 2200/064* (2013.01)

(58) Field of Classification Search
CPC ........... F02N 11/0833; F02N 2200/063; F02N 2200/064; F02N 11/0818; F02N 11/0825; F02N 11/0848
See application file for complete search history.

(56) References Cited

U.S. PATENT DOCUMENTS

| 2005/0099155 A1* | 5/2005 | Okuda | .................. H02J 7/1438 320/162 |
| 2019/0334371 A1* | 10/2019 | Watanabe | ................. B60L 3/00 |

FOREIGN PATENT DOCUMENTS

| DE | 112017002438 T5 * | 1/2019 | ............. F02D 29/02 |
| EP | 2221226 A1 * | 8/2010 | ............ B60W 10/06 |
| JP | 2002-115578 A | 4/2002 | |
| JP | 2015-113724 A | 6/2015 | |

* cited by examiner

*Primary Examiner* — Syed O Hasan
(74) *Attorney, Agent, or Firm* — Oblon, McClelland, Maier & Neustadt, L.L.P.

(57) ABSTRACT

A control apparatus for a vehicle allows execution of an idle-stop control for temporarily stopping an engine, in a case in which a plurality of conditions are satisfied. The plurality of conditions include (i) a first condition is that it is determined upon power ON of the vehicle that the execution of the idle-stop control is allowed in a result of a determination stored upon power OFF of the vehicle last time and (ii) a second condition that it is determined that a smoothed value of an output voltage of a power storage device is at least a predetermined voltage value that guarantees the start of the engine. The smoothed value is obtained by a smoothing processing for smoothing the output voltage during a preparation period from the power ON until elapse of a predetermined time for which an initialization processing of the control apparatus is executed.

6 Claims, 4 Drawing Sheets

CONTROL APPARATUS FOR VEHICLE

This application claims priority from Japanese Patent Application No. 2022-064159 filed on Apr. 7, 2022, the disclosure of which is herein incorporated by reference in its entirety.

FIELD OF THE INVENTION

The present invention relates to a control apparatus for a vehicle that is provided with an engine and a starting device for starting the engine.

BACKGROUND OF THE INVENTION

There is well-known a control apparatus for a vehicle that is provided with (i) an engine and (ii) a starting device including a motor configured to rotate and drive the engine and a power storage device configured to supply an electric power to the motor, such that the starting device is configured to crank the engine by using the motor. JP 2015-113724 A discloses an engine control apparatus as an example of such a control apparatus. In the control apparatus disclosed in the Japanese Patent Application publication, before a charge ratio of a battery is determined after power ON of the vehicle, as long as a predetermined time has not elapsed since the vehicle was stopped last time, it is determined whether an idle-stop control is to be allowed to be executed to automatically stop the engine, depending on the charge ratio of the battery that was calculated when the vehicle was stopped last time.

SUMMARY OF THE INVENTION

By the way, the charge ratio of the battery is likely to be reduced more due to discharge of the battery as the time elapses more since the vehicle was stopped. In the above-identified Japanese Patent Application publication, it is disclosed that an upper limit of the time for allowing execution of the idle-stop control is set to be longer as the charge ratio of the battery is higher when the vehicle was stopped last time. However, the determination is made depending on the charge ratio of the battery when the vehicle was stopped last time. Therefore, there is a risk that the execution of the idle-stop control could be erroneously allowed. Further, in this method of determination made merely depending on the charge ratio of the battery when the vehicle was stopped last time, once the predetermined time has elapsed since the vehicle was stopped, the execution of the idle-stop control is never allowed, so that there is a possibility that opportunity of the execution of the idle-stop control could be excessively lost.

The present invention was made in view of the background art described above. It is therefore an object of the present invention to provide a control apparatus for a vehicle, wherein the control apparatus is capable of suppressing execution of an idle-stop control from being erroneously allowed while suppressing loss of opportunity of the execution of the idle-stop control.

The object indicated above is achieved according to the following aspects of the present invention.

According to a first aspect of the invention, there is provided a control apparatus for a vehicle that is provided with (a) an engine and (b) a starting device including a motor configured to rotate and drive the engine and a power storage device configured to supply an electric power to the motor, such that the starting device is configured to crank the engine by using the motor. The control apparatus includes a starting control portion that is configured to make a determination as to whether allowing execution of an idle-stop control for temporarily stopping the engine, depending on whether it is determined that the power storage device is in a condition that guarantees start of the engine by cranking the engine by using the motor, and to store a result of the determination upon power OFF of the vehicle. The starting control portion is configured to allow the execution of the idle-stop control, in a case in which a plurality of conditions are satisfied, such that the plurality of conditions include (i) a first condition is that it is determined upon power ON of the vehicle that the execution of the idle-stop control is allowed in the result of the determination stored upon the power OFF of the vehicle last time and (ii) a second condition that it is determined that a smoothed value of an output voltage of the power storage device is at least a predetermined voltage value that guarantees the start of the engine, wherein the smoothed value is obtained by a smoothing processing for smoothing the output voltage during a preparation period from the power ON of the vehicle until elapse of a predetermined time for which an initialization processing of the control apparatus is executed.

According to a second aspect of the invention, in the control apparatus according to the first aspect of the invention, the starting control portion is configured to not allow the execution of the idle-stop control and to crank the engine by using the motor, in a case in which at least one of the plurality of conditions is not satisfied, wherein the starting control portion is configured to make the determination again as to whether allowing the execution of the idle-stop control, depending on whether it is determined that the output voltage of the power storage device upon cranking of the engine is at least a predetermined second voltage value that guarantees the start of the engine. The predetermined second voltage value being lower than the predetermined voltage value as a predetermined first voltage value.

According to a third aspect of the invention, in the control apparatus according to the second aspect of the invention, the idle-stop control includes a pre-start-stage idle-stop control executed to keep stopping the engine without starting the engine when the vehicle has not started to run after the power ON of the vehicle and a post-start-stage idle-stop control executed to temporarily stop the engine during running or stop of the vehicle. The starting control portion is configured to allow execution of the pre-start-stage idle-stop control, in the case in which the plurality of conditions are satisfied. The starting control portion is configured to allow execution of the post-start-stage idle-stop control, in a case in which the execution of the pre-start-stage idle-stop control is not allowed and it is determined that the output voltage of the power storage device upon the cranking of the engine is at least the predetermined second voltage value.

According to a fourth aspect of the invention, in the control apparatus according to any one of the first through third aspects of the invention, the starting control portion is configured to initiate the smoothing processing, by setting an initial value of the smoothed value to a voltage value that is not lower than an open circuit voltage of the power storage device. For example, the smoothing processing is executed during the preparation period to calculate the smoothed value in each cycle, such that a latest value of the smoothed value is obtained by adding a division of a voltage difference by a smoothing ratio that is larger than one, to a previous value of the smoothed value, and such that the voltage difference is a difference of a latest value of the output voltage from the previous value of the smoothed value, wherein the second condition is satisfied in a case in which the latest value of the smoothed value upon the elapse of the predetermined time is at least the predetermined voltage value.

According to a fifth aspect of the invention, in the control apparatus according to any one of the first through third aspects of the invention, the plurality of conditions further include (iii) a third condition that it is determined upon the power ON of the vehicle that a temperature of the power storage device is at least a predetermined temperature value that guarantees the start of the engine.

In the control apparatus according to the first aspect of the invention, the execution of the idle-stop control is allowed in the case in which the plurality of conditions are satisfied, such that the plurality of conditions include (i) the first condition is that it is determined upon the power ON of the vehicle that the execution of the idle-stop control is allowed in the result of the determination stored upon the power OFF of the vehicle last time and (ii) the second condition that it is determined that the smoothed value of the output voltage of the power storage device is at least the predetermined voltage value that guarantees the start of the engine, wherein the smoothed value is obtained by the smoothing processing for smoothing the output voltage during the preparation period from the power ON of the vehicle until elapse of the predetermined time for which the initialization processing of the control apparatus is executed. Thus, regardless of a length of a period from the power OFF of last time until the power ON of current time, a current condition of the power storage device can be analogized from the smoothed value of the output voltage of the power storage device, in spite of possible discharge of the power storage device during the period from the power OFF until the power ON. By combining a result of determination using the smoothed value of the output voltage with the result of the determination stored upon the power OFF of the last time, it is possible to ensure accuracy of the determination as to whether the execution of the idle-stop control is to be allowed or not upon the power ON of the current time. It is therefore possible to suppress the execution of the idle-stop control from being erroneously allowed while suppressing loss of opportunity of the execution of the idle-stop control.

In the control apparatus according to the second aspect of the invention, the execution of the idle-stop control is not allowed in the case in which at least one of the plurality of conditions is not satisfied, for example, in a case in which it is determined upon the power ON of the vehicle that the execution of the idle-stop control is not allowed in the result of the determination stored upon the power OFF of the last time or in a case in which it is determined that the smoothed value of the output voltage of the power storage device is lower than the predetermined voltage value. It is therefore possible to suppress erroneous allowance of the execution of the idle-stop control. Further, in this instance, the engine is cranked with use of the motor, and the determination is made again as to whether the execution of the idle-stop control is to be allowed or not, depending on whether it is determined that the output voltage of the power storage device upon cranking of the engine is at least the predetermined second voltage value that guarantees the start of the engine. It is therefore possible to suppress loss of the opportunity of the execution of the idle-stop control.

In the control apparatus according to the third aspect of the invention, the execution of the pre-start-stage idle-stop control is allowed in the case in which the plurality of conditions are satisfied, so that it is possible to suppress the execution of the pre-start-stage idle-stop control from being erroneously allowed while suppressing loss of the opportunity of the execution of the pre-start-stage idle-stop control. Further, the execution of the post-start-stage idle-stop control is allowed, in the case in which the execution of the pre-start-stage idle-stop control is not allowed and it is determined that the output voltage of the power storage device upon the cranking of the engine is at least the predetermined second voltage value, so that it is possible to suppress loss of the opportunity of the execution of the post-start-stage idle-stop control.

In the control apparatus according to the fourth aspect of the invention, the smoothing processing is initiated by setting the initial value of the smoothed value to the voltage value that is not lower than the open circuit voltage of the power storage device. It is therefore possible to suppress the determination from being erroneously made, for example, due to inrush current caused by capacitive components and voltage drop due to operations of various devices in a stage shortly after the power ON.

In the control apparatus according to the fifth aspect of the invention, the plurality of conditions further include the third condition that it is determined upon the power ON of the vehicle that the temperature of the power storage device is at least the predetermined temperature value that guarantees the start of the engine, so that the execution of the idle-stop control is allowed in a case in which at least the first through third conditions are satisfied. Thus, by taking account of the temperature that could affect the outputtable electric power of the power storage device, it is possible to appropriately ensure the accuracy of the determination as to whether the execution of the idle-stop control is to be allowed or not upon the power ON of the current time.

DETAILED DESCRIPTION OF PREFERRED EMBODIMENT

Hereinafter, the preferred embodiment of the invention will be described in detail with reference to the accompanying drawings.

EMBODIMENT

Figure 1:
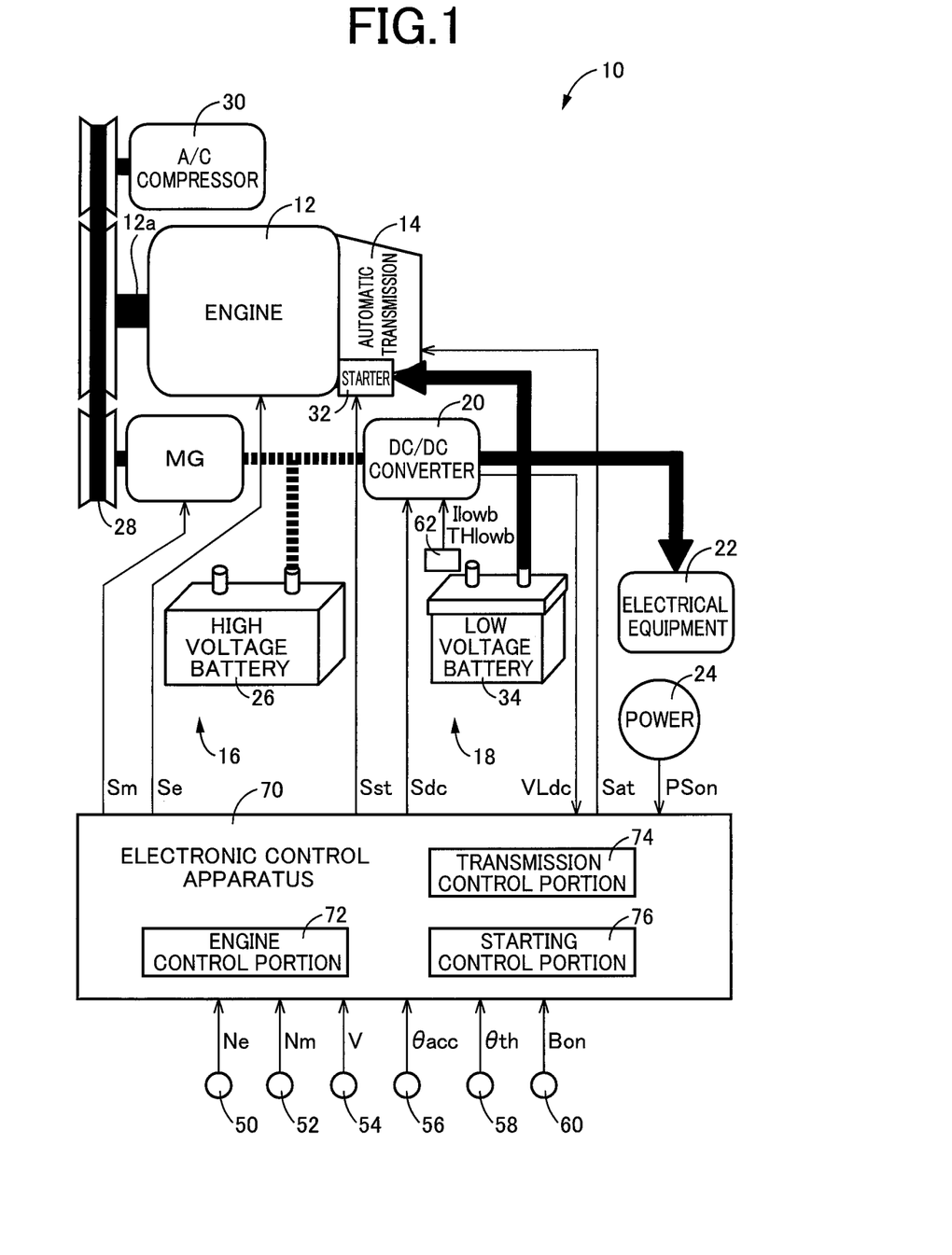
FIG. 1 is a view schematically showing a construction of a vehicle to which the present invention is applied, for explaining major portions of control functions and control systems that are provided to perform various control operations in the vehicle.

FIG. 1 is a view schematically showing a construction of a vehicle 10 to which the present invention is applied, for explaining major portions of control functions and control systems that are provided to perform various control operations in the vehicle 10. As shown in FIG. 1, the vehicle 10 is provided with an engine 12, an automatic transmission 14, a first starting device 16, a second starting device 18, a DC/DC converter 20, electrical equipment (electric loads) 22 and a start button 24.

The engine 12, which is a drive power source, is a known internal combustion engine such as gasoline engine and diesel engine. The vehicle 10 is provided with an engine control device (not shown) that includes a throttle actuator, a fuel injection device and an ignition device. With the engine control device being controlled by an electronic control apparatus 70 that is described below, an engine torque Te, which is an output torque of the engine 12, is controlled.

The automatic transmission 14 is may be constituted by a known automatic transmission of planetary gear type, a synchronous mesh twin shaft parallel axis-type automatic transmission including a known DCT (Dual Clutch Transmission), a known belt-type continuously variable transmission or a known electrically-operated continuously variable transmission, for example. The engine 12 is connected to the automatic transmission 14 in a power transmittable manner, such that a drive power of the engine 12 is to be transmitted toward drive wheels (not shown).

The first starting device 16 includes an electric motor MG and a high voltage battery 26. The electric motor MG is a motor generator having a function serving as a motor for generating a mechanical power from an electric power and also a function serving as a generator for generating an electric power from a mechanical power. The electric motor MG is connected to the high voltage battery 26 through an inverter that is provided integrally with the electric motor MG. The high voltage battery 26 is an electric-power storage device for supplying and receiving the electric power to and from the electric motor MG. With the inverter being controlled by the electronic control apparatus 70, an MG torque Tm, which is a torque of the electric motor MG, is controlled. The electric motor MG is driven by electric power supplied from the high voltage battery 26 during power driving. The electric motor MG supplies the generated electric power to the high voltage battery 26 during regeneration.

The electric motor MG is connected in a power transmittable manner to a crankshaft 12a of the engine 12 via a drive belt 28 provided on the vehicle 10. The electric motor MG has a function of rotating or cranking the engine 12 by power driving operation when the engine 12 is stopped. That is, the first starting device 16 has a function of cranking the engine 12 by using the electric motor MG. Further, the electric motor MG has a function of assisting the power of the engine 12 by the power driving operation when the engine 12 is operated. Still further, the electric motor MG has a function of generating the electric power from the power of the engine 12 by regenerative operation when the engine 12 is operated. Moreover, the electric motor MG has a function of generating the electric power from a driven force inputted from the drive wheels by the regenerative operation during deceleration running of the vehicle 10.

To the crankshaft 12a of the engine 12, not only the electric motor MG but also auxiliary devices provided in the vehicle 10 are operatively connected through the drive belt 28, so that the auxiliary devices are to be operated or driven by the engine 12, wherein the auxiliary devices include an A/C compressor 30 (that is a compressor for an air conditioner), a power steering pump (not shown) and a water pump (not shown). Where the electric motor MG and the auxiliary devices such as the A/C compressor 30 are connected to the crankshaft 12a through an electromagnetic clutch (not shown), for example, the electric motor MG and the auxiliary devices are to be operated or driven by only the electric motor MG when the electromagnetic clutch is released. That is, the electric motor MG has a function of driving the auxiliary devices such as the A/C compressor 30 during an idle-stop control CTspid1 that is executed to temporarily stop operation of the engine 12.

The idle-stop control CTspid1 is an automatic engine stop control that is executed to automatically stop the engine 12 by fuel cut or the like, and to automatically restart the engine 12 in case of satisfaction of a restart condition such as release of a brake pedal and depression of an acceleration pedal. The idle-stop control CTspid1 includes: (i) a pre-start-stage idle-stop control FIS (First Idling Stop) for keeping stopping the engine 12 without starting the engine 12 when the vehicle 10 has not started to run after power ON of the vehicle 10; and (b) a post-start-stage idle-stop control S&S (Stop and Start) for temporarily stopping the engine 12 during running or stop of the vehicle 10. The post-start-stage idle-stop control S&S is a normal idle-stop control. The power ON of the vehicle 10 corresponds to a state of an ignition ON (IG-ON).

The second starting device 18 includes a starter motor 32 and a low voltage battery 34. The starter motor 32 is configured to drive and rotate the engine 12. The starter motor 32 is a motor used for staring the engine 12, and is to be driven by the electric power supplied from the low voltage battery 34. That is, the starter motor 32 is a motor exclusively for driving and rotating the engine 12, namely, cranking the engine 12 when the engine 12 is to be started. The second starting device 18 has a function of cranking the engine 12 by using the starter motor 32.

The DC/DC converter 20 is connected to the high voltage battery 26. The DC/DC converter 20 is configured to lower a voltage of the electric power supplied from the high voltage battery 26, and to supply the electric power (whose voltage has been lowered) to the low voltage battery 34 and the electrical equipment 22 so as to charge the low voltage battery 34 and so as to operate the electrical equipment 22. The low voltage battery 34 is connected to the DC/DC converter 20, so as to be charged with the electric power originally supplied from the high voltage battery 26 through the DC/DC converter 20. The low voltage battery 34 is a low-voltage power supply device which is to be chargeable by the high voltage battery 26 and which is configured to supply the electric power to the starter motor 32. The high voltage battery 26 is a high-voltage power supply device for storing the electric power whose voltage is higher than the voltage of the electric power stored in the low voltage battery 34, and is capable of charging the low voltage battery 34. The high voltage battery 26 is a second battery such as lithium-ion battery and nickel-metal hydride battery. The low voltage battery 34 is a secondary battery such as lead-acid battery.

The electrical equipment 22 consist of a plurality of kinds of electrically-operated devices that are to be operated by the electric power supplied from the low voltage battery 34, for example. The electrical equipment 22 include a wiper, a blower motor and a navigation system, for example. Further, although not being shown in the drawings, the electric power is supplied from the low voltage battery 34, for example, also to operate the electronic control apparatus 70 and other various ECUs (Electronic Control Units).

The start button 24 is a power switch that is to be operated by a driver of the vehicle 10 (hereinafter referred to as "vehicle driver") to switch a state of a vehicle power, i.e., a state of supply of the electric power in the vehicle 10. The start button 24 is a momentary-type push button switch, for example, and is to be operatively pressed to a switch ON position by the vehicle driver. Each time being operatively pressed to the switch ON position, the start button 24 outputs a power switch signal PSon indicative of the switch ON position, and the outputted power switch signal PSon is supplied to the electronic control apparatus 70, such that the electronic control apparatus 70 detects the operation of the start button 24 by the vehicle driver when receiving the power switch signal PSon.

The state of the vehicle power is categorized into an IG-OFF state that is an ignition OFF state, an ACC state that is an accessory-ON state as a partial ON state, and an IG-ON state that is an ignition ON state as an ON state. The IG-OFF state is a state that disables the vehicle 10 to run and disables also a part of functions that is not involved in running of the vehicle 10. The ACC state is a state that disables the vehicle 10 to run with a combination meter (not shown) being tuned off and enables a part of functions that is not involved in running of the vehicle 10. The IG-ON state is a state that enables the vehicle 10 to run with the combination meter being turned on.

The vehicle 10 is further provided with the above-described electronic control apparatus 70 including a control apparatus for the vehicle 10. For example, the electronic control apparatus 70 includes a so-called microcomputer incorporating a CPU, a ROM, a RAM and an input-output interface. The CPU performs control operations of the vehicle 10, by processing various input signals, according to control programs stored in the ROM, while utilizing a temporary data storage function of the RAM. The electronic control apparatus 70 may be constituted by two or more control units exclusively assigned to perform different control operations such as an engine control operation and a transmission control operation, as needed.

The electronic control apparatus 70 receives various input signals based on values detected by respective sensors provided in the vehicle 10. Specifically, the electronic control apparatus 70 receives: an output signal of the DC/DC converter 20 indicative of a DC/DC power supply voltage VLdc; an output signal of the start button 24 that is the power switch signal P Son; an output signal of an engine speed sensor 50 indicative of an engine rotational speed Ne that is a rotational speed of the engine 12; an output signal of an MG speed sensor 52 indicative of a motor rotational speed Nm that is a rotational speed of the electric motor MG; an output signal of a vehicle speed sensor 54 indicative of a running speed V of the vehicle 10; an output signal of an accelerator-opening degree sensor 56 indicative of the accelerator opening degree (accelerator operation degree) θacc corresponding to an amount of operation of an acceleration operating member made by the vehicle driver; an output signal of a throttle-valve-opening degree sensor 58 indicative of a throttle opening degree θth that is an opening degree of an electronic throttle valve; and an output signal of a brake switch 60 that is a brake ON signal Bon representing a state in which the brake pedal is being operated by the vehicle driver so as to operate wheel brakes.

The DC/DC power supply voltage VLdc is an output voltage of the DC/DC converter 20 to which the output voltage of the high voltage battery 26 has been lowered, and is supplied to the low voltage battery 34, for example. The DC/DC power supply voltage VLdc represents an output voltage of the low voltage battery 34 as well as the output voltage of the DC/DC converter 20. The DC/DC converter 20 includes a microcomputer, for example, and has a function of detecting the DC/DC power supply voltage VLdc. The DC/DC converter 20 receives various input signals based on values detected by a low-voltage battery sensor 62 provided in the vehicle 10, wherein the various input signals include a low-voltage-battery temperature THlowb that is a temperature of the low voltage battery 34 and a low-voltage battery charging/discharging electric current Ilowb that is a charging/discharging electric current of the low voltage battery 34.

The DC/DC converter 20 is configured to calculate a state of charge SOC [%] of the low voltage battery 34, for example, based on an integrated value of a low-voltage-battery charge/discharge current Ilowb. The state of charge SOC is a charge state value representing a charge state of the low voltage battery 34, and a charge ratio representing a ratio of a remaining charge capacity of the low voltage battery 34 to a full charge capacity of the low voltage battery 34. An outputtable electric power of the low voltage battery 34, i.e., a maximum electric power that can be outputted from the low voltage battery 34, is reduced with reduction of the low-voltage-battery temperature THlowb when the low-voltage-battery temperature THlowb is in a low range lower than a normal range. Further, the outputtable electric power of the low voltage battery 34 is reduced with reduction of the state of charge SOC when the state of charge SOC is in a low range. It is noted that the low-voltage-battery temperature THlowb and the low-voltage-battery charge/discharge current Ilowb may be supplied to the electronic control apparatus 70, and that the state of charge SOC of the low voltage battery 34 may be calculated by the electronic control apparatus 70.

The electronic control apparatus 70 generates various output signals to the various devices provided in the vehicle 10, such as: an engine control command signal Se that is to be supplied to the engine 12; a transmission control command signal Sat that is to be supplied to the automatic transmission 14; an MG control command signal Sm that is to be supplied to the rotating machine MG; a DC/DC control command signal Sdc that is to be supplied to the DC/DC converter 20; and a starter control command signal Sst that is to be supplied to the starter motor 32.

For performing various control operations, the electronic control apparatus 70 includes an engine control means in the form of an engine control portion 72, a transmission control means in the form of a transmission control portion 74 and a start control means in the form of a starting control portion 76.

The engine control portion 72 calculates a drive request amount requested to the vehicle 10 by the vehicle driver, by applying the accelerator opening degree θacc and the vehicle running speed V to a drive request amount map, for example, wherein the drive request amount is a requested drive torque Trdem [Nm] that is to be applied to the drive wheels, for example, and wherein the drive request amount map represents a pre-stored relationship obtained by experimentation or determined by an appropriate design theory. As the requested drive amount, another value such as a requested drive force Frdem [N] to be applied to the drive wheels may be used, too. The engine control portion 72 outputs the engine control command signal Se for controlling the engine 12 such that the requested drive torque Trdem is realized by the outputted engine control command signal Se supplied to the engine control device 72, by taking account of various factors such as a transmission loss, an auxiliary device load and a gear ratio of the automatic transmission 14.

The transmission control portion 74 determines whether a shifting action is to be executed in the automatic transmission 14, by using, for example, a shifting map that represents a predetermined relationship, and outputs the transmission control command signal Sat, as needed, which is supplied to the automatic transmission 14, for executing the shifting action in the automatic transmission 14, depending on the determination using the shifting map. In the shifting map, the predetermined relationship is represented by shifting lines in two-dimensional coordinates in which the vehicle running speed V and the requested drive torque Trdem as two variables are taken along respective two axes, wherein the shifting lines are used for the determination as to whether the shifting action is to be executed in the automatic transmission 14.

The starting control portion 76 determines whether the start of the engine 12 is requested or not, namely, whether an operation state of the engine 12 is requested to be switched from its stopped state to its driven state. In this determination, an affirmative determination is made, for example, when a pre-start-stage idle-stop control FIS is not being executed when the vehicle power is placed in the IG-ON state, and/or when the idle-stop control CTspid1 is terminated when the brake ON signal Bon is switched to OFF during execution of the idle-stop control CTspid1. In the following description regarding the present embodiment, the request for start of the engine 12 upon termination of the idle-stop control CTspid1 will be referred to as "request for restart of the engine 12, when being distinguished from the request for first start of the engine 12 upon switching of the vehicle power from the IG-OFF state to the IG-ON state.

When determining that the start of the engine 12 is requested, the starting control portion 76 cranks the engine 12 by using the first starting device 16. Specifically described, when determining that the start of the engine 12 is requested, the starting control portion 76 outputs, to the electric motor MG, the MG control command signal Sm for causing the electric motor MG to output a cranking torque Tcr. Further, the starting control portion 76 outputs, to the engine 12, the engine control command signal Se for initiating fuel supply and engine ignition, in conjunction with cranking of the engine 12 by the electric motor MG. The cranking torque Tcr is a predetermined torque required for increasing the engine rotational speed Ne, namely, for cranking the engine 12. The cranking torque Tcr is, for example, a constant torque that is predetermined based on, for example, specifications of the engine 12.

In a case in which the maximum dischargeable amount of the high voltage battery 26 is small or when the supply of the electric power from the high voltage battery 26 is difficult, when the engine 12 is to be started, it is difficult to appropriately control the electric motor MG. Therefore, there is a case in which the start of the engine 12 by cranking the engine 12 by using the first starting device 16 is difficult to be done, for example, when the vehicle 10 is in a predetermined cryogenic environment in which it is determined that the electric motor MG cannot be appropriately controlled.

In a case in which the vehicle 10 is in the predetermined cryogenic environment in which it is determined that the electric motor MG cannot be appropriately controlled, when the engine 12 is to be started, the starting control portion 76 is configured to crank the engine 12 by using the second starting device 18 in place of using the first starting device 16. Specifically described, when determining that the start of the engine 12 is requested, the starting control portion 76 determines whether the vehicle 10 is in the predetermined cryogenic environment or not. When determining that the vehicle 10 is in the predetermined cryogenic environment, the starting control portion 76 outputs, to the starter motor 32, the starter control command signal Sst for operating the starter motor 32, so as to crank the engine 12 by using the starter motor 32. Further, in this instance, the starting control portion 76 outputs, to the engine 12, the engine control command signal Se for initiating the fuel supply and the engine ignition, in conjunction with the cranking of the engine 12 by the starter motor 32. When the engine 12 is placed in a complete explosion state, the starting control portion 76 stops the cranking of the engine 12 by the starter motor 32, by stopping output of the starter control command signal Sst.

Thus, the starting control portion 76 is configured, when the engine 12 is to be started, to crank the engine 12 by using the first starting device 16 with a higher priority than using the second starting device 18. That is, the cranking of the engine 12 with use of the first starting device 16 is executed preferentially, when the engine 12 is to be started due to switching of the vehicle power from the IG-OFF state to the IG-ON state or due to termination of the idle-stop control CTspid1. On the other hand, in the cryogenic environment, the engine 12 is cranked with use of the second starting device 18 in place of the first starting device 16. It is noted that, when the engine 12 is to be started for the first time due to switching of the vehicle power from the IG-OFF state to the IG-ON state, the required cranking torque Tcr is likely to be large because the engine 12 has not yet been wormed, so that the engine 12 may be cranked with use of the second starting device 18.

When the engine 12 is to be started, there is a possibility that the start of the engine 12 with use of the first starting device 16 could fail. In event of failure of the start of the engine 12 with use of the first starting device 16, the cranking of the engine 12 is executed with use of the second starting device 18. Thus, the cranking of the engine 12 with use of the second starting device 18 has a back-up function when the engine 12 is to be started.

Since the cranking of the engine 12 with use of the second starting device 18 has the back-up function, it is better not to execute the idle-stop control CTspid1 in a case in which the start of the engine 12 using the second starting device 18 cannot be guaranteed. The starting control portion 76 inhibits execution of the idle-stop control CTspid1 in such a case in which the start of the engine 12 using the second starting device 18 cannot be guaranteed. On the other hand, the starting control portion 76 allows the execution of the idle-stop control CTspid1 in the case in which the start of the engine 12 using the second starting device 18 can be guaranteed.

When the low voltage battery 34 is in a good condition, it is possible to guarantee the start of the engine 12 using the second starting device 18. The starting control portion 76 makes a determination as to whether allowing the execution of the idle-stop control CTspid1 or not, depending on whether determining that the low voltage battery 34 is in a condition that can guarantee the start of the engine 12 using the starter motor 32 or not. The condition of the low voltage battery 34 can be represented by, for example, a degradation state of the low voltage battery 34 or the charge state, i.e., the state of charge SOC of the low voltage battery 34. The condition of the low voltage battery 34 can be determined depending on an engine-start voltage VLst that is a value of the DC/DC power supply voltage VLdc as the output voltage of the low voltage battery 34 at a point of time at which the start of the engine 12 using the second starting device 18 is successfully done. The engine-start voltage VLst is the value of the DC/DC power supply voltage VLdc upon successful start of the engine 12 using the second starting device 18. That is, the engine-start voltage VLst is the value of the DC/DC power supply voltage VLdc at a point of time at which the engine 12 is placed in the complete explosion state whereby the cranking of the engine 12 is completed.

Figure 2:
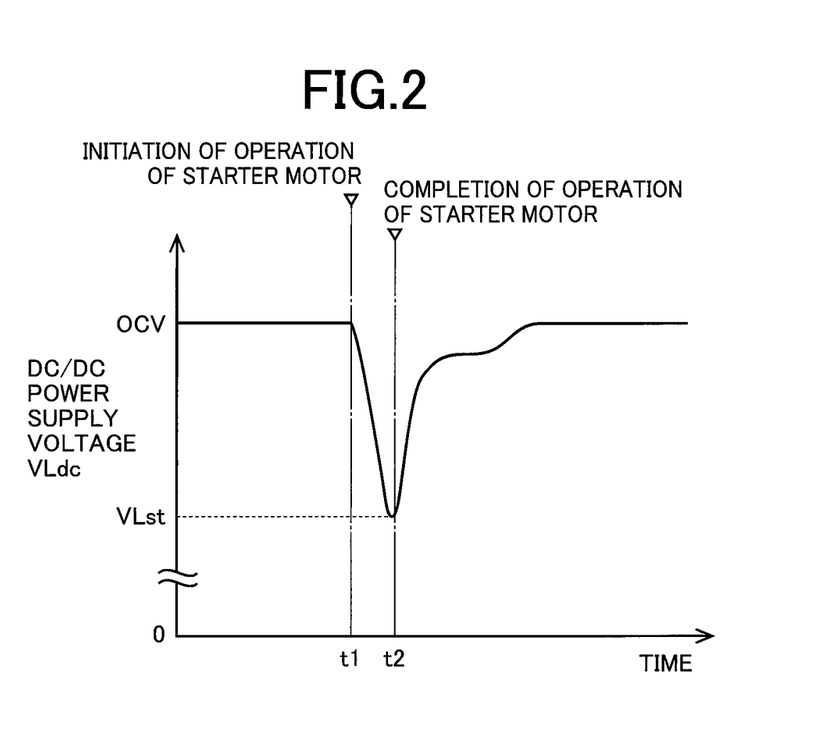
FIG. 2 is a view showing, by way of example, change of an output voltage of a low voltage battery when an engine is started with use of a second starting device (starter motor)

FIG. 2 is a view showing, by way of example, change of the DC/DC power supply voltage VLdc as the output voltage of the low voltage battery 34 when the engine 12 is started with use of the second starting device 18. In FIG. 2, time point t1 represents a point of time at which the cranking of the engine 12 using the second starting device 18 is initiated, namely, at which an operation of the starter motor 32 is initiated. As the operation of the starter motor 32 is initiated, the DC/DC power supply voltage VLdc is reduced from an open circuit voltage OCV. When the engine 12 has been successfully started and the operation of the starter motor 32 has been completed, the DC/DC power supply voltage VLdc is increased toward the open circuit voltage OCV (see time point t2 and thereafter). The value of the DC/DC power supply voltage VLdc at the time point t2 at which the start of the engine 12 is successfully done and the operation of the starter motor 32 is completed, corresponds to the engine-start voltage VLst. The open circuit voltage OCV corresponds to a voltage between terminals of the low voltage battery 34 in a stage in which any load is not applied to the low voltage battery 34.

Referring back to FIG. 1, the starting control portion 76 determines whether the low voltage battery 34 is in the good condition or not, depending on the engine-start voltage VLst and the state of charge SOC of the low voltage battery 34, and determines whether allowing the execution of the idle-stop control CTspid1 or not, depending on whether determining that the low voltage battery 34 is in the good condition, or not.

The allowing the execution of the idle-stop control CTspid1 includes (i) allowing the pre-start-stage idle-stop control FIS in a next trip of the vehicle 10 after the vehicle power is placed into the IG-ON state from the IG-OFF state and (ii) allowing the post-start-stage idle-stop control S&S next time in a current trip of the vehicle 10 in which the vehicle power is being kept in the IG-ON state. It is possible to execute an FIS determination and an S&S determination independently of each other, wherein the FIS determination is a determination as to whether allowing an execution of the pre-start-stage idle-stop control FIS or not, while the S&S determination is a determination as to whether allowing an execution of the post-start-stage idle-stop control S&S or not. When the execution of the pre-start-stage idle-stop control FIS is allowed in an FIS determination result that is a result of the FIS determination, an FIS allowance flag is placed in its ON state. When the execution of the pre-start-stage idle-stop control FIS is not allowed in the FIS determination result, the FIS allowance flag is placed in its OFF state. When the execution of the post-start-stage idle-stop control S&S is allowed in an S&S determination result that is a result of the S&S determination, an S&S allowance flag is placed in its ON state. When the execution of the post-start-stage idle-stop control S&S is not allowed in the S&S determination result, the S&S allowance flag is placed in its OFF state.

The FIS determination result is the result of the FIS determination as to whether the execution of the pre-start-stage idle-stop control FIS is to be allowed or not in the next trip of the vehicle 10. Therefore, when the vehicle power is placed into the IG-OFF state, the starting control portion 76 stores a result of a determination as to whether the idle-stop control CTspid1 is to be allowed or not, particularly, the FIS determination result, in a non-volatile memory or the like. Some of the various ECUs such as the electronic control apparatus 70 are kept operated for a certain length of time even after the vehicle power has been placed in the IG-OFF state. Ones of the ECUs, which are related to security functions and detection functions (e.g., function of detecting a vehicle key), continue to be operated even after the vehicle power has been placed in the IG-OFF state. The starting control portion 76 may store the S&S determination result as well as the FIS determination result in the non-volatile memory or the like when the vehicle power is placed into the IG-OFF state. Alternatively, the starting control portion 76 may place the S&S allowance flag into its ON state in a default setting when the vehicle power is placed into the IG-OFF state.

By the way, even in a period in which the vehicle power is in the IG-OFF state, the state of charge SOC of the low voltage battery 34 is discharged to be reduced due to a standby power or the like. Therefore, if the FIS determination result (that is the result of the FIS determination as to whether the execution of the pre-start-stage idle-stop control FIS is to be allowed) stored in the last trip is used when the vehicle power is placed in the IG-ON state, there is a possibility that the pre-start-stage idle-stop control FIS could be erroneously allowed.

It is preferable to execute the pre-start-stage idle-stop control FIS after elapse of a preparation period TRp that is a period until a predetermined time TMf elapses since the vehicle power is placed into the IG-ON state, wherein the predetermined time TMf is a time for which an initialization processing of the electronic control apparatus 70 (initialization processing of the various ECUs including the electronic control apparatus 70) is executed. Therefore, the FIS determination related to the pre-start-stage idle-stop control FIS needs to be fixed or finalized when the preparation period TRp has elapsed. The above-described initialization processing is, for example, a known initial processing executed in a computer.

In a period in which the vehicle power is placed in the IG-OFF state in which the DC/DC converter 20 (that is configured to calculate the state of charge SOC of the low voltage battery 34) is not operated, the integrated value of the low-voltage-battery charge/discharge current Ilowb is unknown. In the preparation period TRp that is a short length of time, it is difficult to determine the state of charge SOC by a method that does not use the integrated value of the low-voltage-battery charge/discharge current Ilowb.

In the preparation period TRp, it might be possible to idle the starter motor 32, i.e., drive the starter motor 32 in a state in which the engine 12 cannot be driven and rotated, and to detect the engine-start voltage VLst so as to determine whether allowing execution of the pre-start-stage idle-stop control FIS or not. However, in this method by idling the starter motor 32, the various ECUs are reset by reduction of the DC/DC power supply voltage VLdc, and the initialization processing of the various ECUs is restarted, thereby causing a risk that the initialization processing could be extended. Further, in a stage shortly after the vehicle power is placed into the IG-ON state, the reduction of the voltage of the high voltage battery 26 by the DC/DC converter 20 is not stabilized, so that an amount of the reduction of the voltage of the DC/DC power supply voltage VLdc by operation of the starter motor 32 is made large, whereby the various ECUs are likely to be reset. Moreover, although the pre-start-stage idle-stop control FIS is executed for purpose of obtaining quietness and reducing fuel consumption by stopping the engine 12, the quietness is likely to be impaired by the operation of starter motor 32.

In the present embodiment, the starting control portion 76 analogizes the condition of the low voltage battery 34 after the IG-ON state, by taking into account an amount of discharge of the low voltage battery 34 during the IG-OFF state, from a smoothed ECU-voltage value VLse in the preparation period TRp. The starting control portion 76 fixes or finalizes the FIS determination in the IG-ON state of a current trip of the vehicle 10, by using the FIS determination result stored in the IG-OFF state of the last trip of the vehicle 10 and also a result of the FIS determination made based on the smoothed ECU-voltage value VLse. The smoothed ECU-voltage value VLse is a smoothed value of the DC/DC power supply voltage VLdc, which is obtained by a moderating or smoothing processing for moderating or smoothing the DC/DC power supply voltage VLdc in the preparation period TRp.

Specifically, the starting control portion 76 calculates the smoothed ECU-voltage value VLse, by using the following formula (1), in each predetermined control cycle in the preparation period TRp. In the following formula (1), "VLse (n)" is a current (latest) value of the smoothed ECU-voltage value VLse calculated in the current control cycle, "VLse (n−1)" is a previous value of the smoothed ECU-voltage value VLse calculated in the previous control cycle, "Ldc" is a current (latest) value of the DC/DC power supply voltage VLdc detected in the current control cycle, and "S" is a predetermined smoothing amount or ratio that is larger than one. The starting control portion 76 sets the current value "VLse (n)" calculated upon elapse of the predetermined time TMf, i.e., at a time of completion of the preparation period TRp, to the smoothed ECU-voltage value VLse that is to be used in the FIS determination. The smoothed ECU-voltage value VLse is calculated by moderating or smoothing fluctuation of the DC/DC power supply voltage VLdc, for example, in a short period immediately after the vehicle power is placed into the IG-ON state. Thus, the smoothed ECU-voltage value VLse is used for preventing the FIS determination from being erroneously made.

$$VLse(n) = VLse(n-1) + (VLdc - VLse(n-1))/S \quad (1)$$

In the above-described formula (1), a predetermined voltage value, which is not lower than the open circuit voltage OCV of the low voltage battery 34, is set as an initial value of the smoothed ECU-voltage value VLse, i.e., as a value that is set as "VLse (n−1)" in the first calculation using the above-described formula (1). This is for the purpose of suppressing the FIS determination from being erroneously made, for example, due to inrush current caused by capacitive components and voltage drop due to operations of various ECUs in the stage shortly after the vehicle power is placed into the IG-ON state. Thus, the starting control portion 76 initiates the smoothing processing for smoothing the DC/DC power supply voltage VLdc in the preparation period TRp, by setting the predetermined voltage value (not lower than the open circuit voltage OCV) as the initial value of the smoothed ECU-voltage value VLse. As indicated in the formula (1), the current value VLse (n) of the smoothed ECU-voltage value VLse is obtained by adding a division of a voltage difference by the smoothing ratio S that is larger than one, to the previous value VLse (n−1) of the smoothed ECU-voltage value VLse, wherein the voltage difference is a difference of the current value of the DC/DC power supply voltage VLdc from the previous value VLse (n−1) of the smoothed ECU-voltage value VLse.

When the vehicle power is placed into IG-ON state, the starting control portion 76 determines whether the execution of the idle-stop control CTspid1 (particularly, the pre-start-stage idle-stop control FIS) is allowed or not in the result of the determination (particularly, the FIS determination result) that was stored in the IG-OFF state of the vehicle power last time. Further, in this instance, the starting control portion 76 further determines whether the smoothed ECU-voltage value VLse is at least a predetermined voltage value VLsef that can guarantee the start of the engine 12. When the smoothed ECU-voltage value VLse is low, namely, when it can be analogized that the state of charge SOC of the low voltage battery 34 is low, the outputtable electric power of the low voltage battery 34 is likely to be reduced and accordingly restart of the engine 12 from the pre-start-stage idle-stop control FIS could become difficult. The predetermined voltage value VLsef is a predetermined threshold value that guarantees the restart of the engine 12 from the pre-start-stage idle-stop control FIS.

The starting control portion 76 allows execution of the idle-stop control CTspid1, particularly, the pre-start-stage idle-stop control FIS, in a case in which a plurality of conditions are both satisfied, wherein the plurality of conditions consist of (i) a first condition is that it is determined in the IG-ON state of the vehicle power that the execution of the idle-stop control CTspid1 (particularly, the pre-start-stage idle-stop control FIS) is allowed in the FIS determination result that was stored in the IG-OFF state of the vehicle power last time and (ii) a second condition that it is determined in the IG-ON state of the vehicle power that the smoothed ECU-voltage value VLse is not lower than the predetermined voltage value VLsef. The allowing the execution of the pre-start-stage idle-stop control FIS means positively making the FIS determination and placing the FIS allowance flag into its ON state.

The starting control portion 76 does not allow the execution of the pre-start-stage idle-stop control FIS, in a case in which at least one of the above-described first and second conditions is not satisfied, namely, in a case in which it is determined in the IG-ON state of the vehicle power that the execution of the idle-stop control CTspid1 (particularly, the pre-start-stage idle-stop control FIS) is not allowed in the FIS determination result that was stored in the IG-OFF state of the vehicle power last time, and/or it is determined in the IG-ON state of the vehicle power that the smoothed ECU-voltage value VLse is lower than the predetermined voltage value VLsef. The not allowing the execution of the pre-start-stage idle-stop control FIS means negatively making the FIS determination and placing the FIS allowance flag into its OFF state.

When not allowing the execution of the pre-start-stage idle-stop control FIS, the starting control portion 76 outputs a command requesting the engine 12 to be started for the first time after the vehicle power is placed into the IG-ON state. In this instance, it might be possible to crank the engine 12 by using the first starting device 16. However, in that case, even if the engine 12 has been successfully started with use of the first starting device 16, it is still unknown if the start of the engine 12 with use of the second starting device 18 can be guaranteed, so that it is preferable to inhibit execution of the post-start-stage idle-stop control S&S, too. On the other hand, where the first start of the engine 12 is attempted with use of the second starting device 18, it is possible to check if the start of the engine 12 with use of the second starting device 18 is guaranteed or not. Therefore, in the present embodiment, when not allowing the execution of the pre-start-stage idle-stop control FIS, the starting control portion 76 does not inhibit the execution of the post-start-stage idle-stop control S&S and outputs a first starter engine-start command, i.e., a command requesting the first start of the engine 12 by cranking the engine 12 with use of the starter motor 32. That is, in the above-described case in which it is determined in the IG-ON state of the vehicle power that the execution of the pre-start-stage idle-stop control FIS is not allowed in the FIS determination result that was stored in the IG-OFF state of the vehicle power last time, and/or it is determined in the IG-ON state of the vehicle power that the smoothed ECU-voltage value VLse is lower than the predetermined voltage value VLsef, the starting control portion 76 keeps the S&S allowance flag in the ON state and starts the engine 12 by cranking the engine 12 with use of the starter motor 32.

When the cranking of the engine 12 with use of the starter motor 32 is executed, the starting control portion 76 makes the determination again as to whether allowing the execution of the idle-stop control CTspid1, particularly, the post-start-stage idle-stop control S&S, depending on whether it is determined that the engine-start voltage VLst is at least a predetermined second voltage value VLstf that guarantees the start of the engine 12. The predetermined second voltage value VLstf is a predetermined threshold value for determining whether the condition of the low voltage battery 34 is good enough to guarantee the start of the engine 12 using the second starting device 18, for example, and is set to a value lower than the above-described predetermined voltage value VLsef.

Specifically, when the engine-start voltage VLst is not lower than the predetermined second voltage value VLstf, the starting control portion 76 keeps the S&S allowance flag in the ON state. In this instance, the starting control portion 76 may switch the FIS allowance flag from the OFF state to the ON state. On the other hand, when the engine-start voltage VLst is lower than the predetermined second voltage value VLstf, the starting control portion 76 switches the S&S allowance flag to the OFF state.

When the low-voltage-battery temperature THlowb is low in the IG-ON state in the current trip, the outputtable electric power of the low voltage battery 34 is likely to be reduced and accordingly restart of the engine 12 from the pre-start-stage idle-stop control FIS could become difficult. Therefore, the starting control portion 76 may be configured to determine also whether the low-voltage-battery temperature THlowb is at least a predetermined temperature value THlowbf that can guarantee the start of the engine 12 or not. The predetermined temperature value THlowbf is a predetermined threshold value that guarantees the restart of the engine 12 from the pre-start-stage idle-stop control FIS.

Thus, the above-described plurality of conditions may include, in addition to the above-described first and second conditions, a third condition that it is determined in the IG-ON state of the vehicle power that the low-voltage-battery temperature THlowb is not lower than the predetermined temperature value THlowbf, so that the starting control portion 76 allows the execution of the idle-stop control CTspid1, particularly, the pre-start-stage idle-stop control FIS, in a case in which the first, second and third conditions are all satisfied, namely, in a case in which (i) it is determined in the IG-ON state that the execution of the idle-stop control CTspid1 (particularly, the pre-start-stage idle-stop control FIS) is allowed in the FIS determination result that was stored in the IG-OFF state last time, (ii) it is determined in the IG-ON state that the smoothed ECU-voltage value VLse is not lower than the predetermined voltage value VLsef and (iii) it is determined in the IG-ON state that the low-voltage-battery temperature THlowb is not lower than the predetermined temperature value THlowbf. That is, the starting control portion 76 may inhibit the execution of the pre-start-stage idle-stop control FIS in a case in which it is determined in the IG-ON state that the smoothed ECU-voltage value VLse is lower than the predetermined voltage value VLsef.

Figure 3:
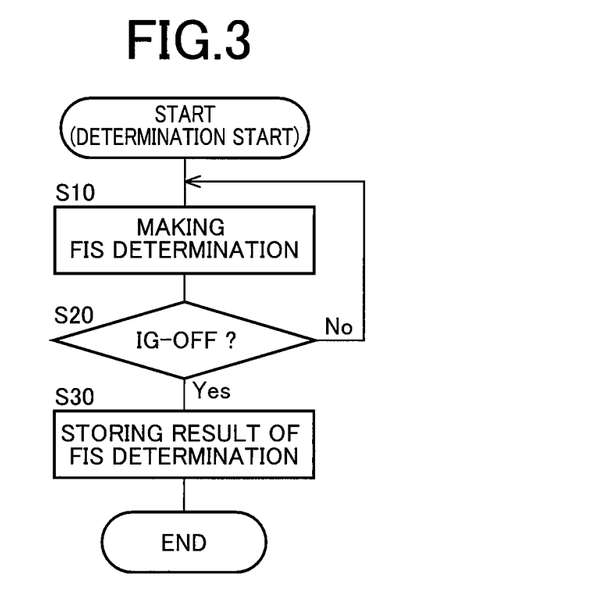
FIG. 3 is a flow chart showing a main part of a control routine executed by an electronic control apparatus, namely, a control routine that is executed during a last trip of the vehicle, for suppressing erroneous allowance of execution of an idle-stop control while suppressing loss of opportunity of the execution of the idle-stop control.
Figure 4:
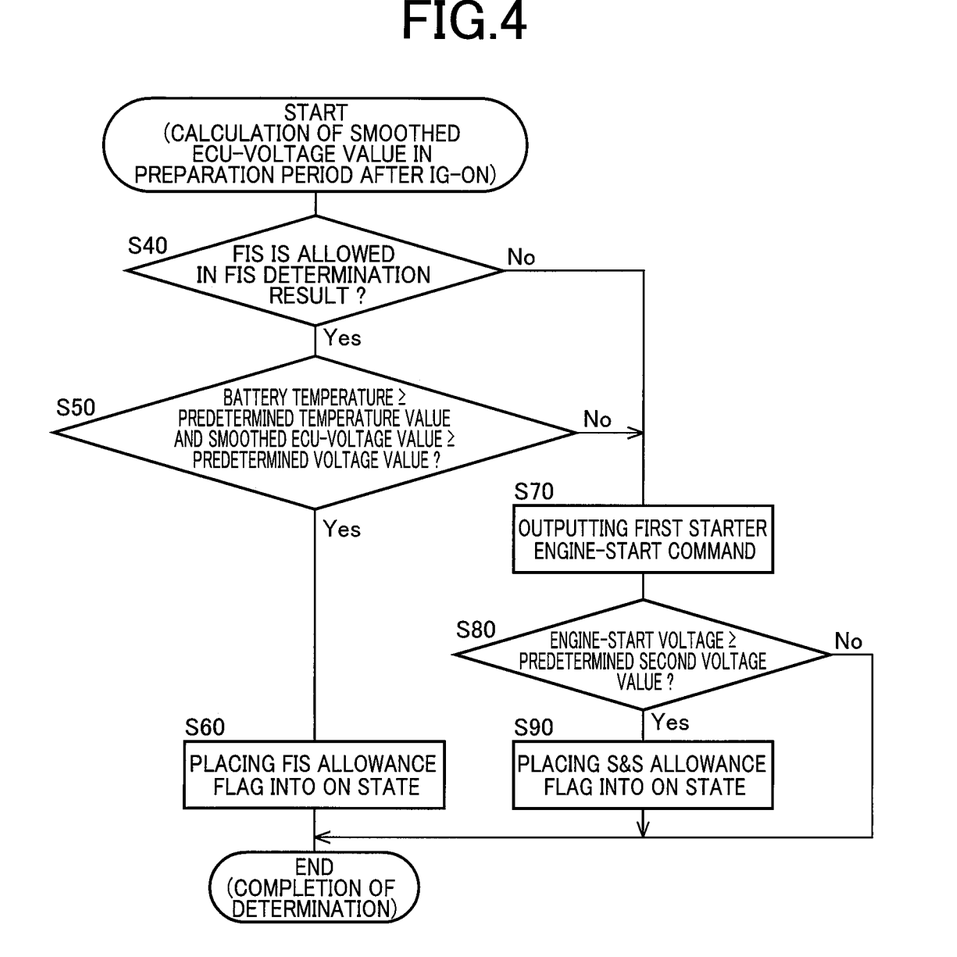
FIG. 4 is a flow chart showing a main part of a control routine executed by the electronic control apparatus, namely, a control routine that is executed during a current trip of the vehicle, for suppressing the erroneous allowance of the execution of the idle-stop control while suppressing the loss of the opportunity of the execution of the idle-stop control.

Each of FIGS. 3 and 4 is a flow chart showing a main part of a control routine executed by an electronic control apparatus, namely, a control routine that is executed for suppressing erroneous allowance of the execution of the idle-stop control CTspid1 while suppressing loss of opportunity of the execution of the idle-stop control CTspid1. The control routine shown in the flow chart of each of FIGS. 3 and 4 is executed, for example, during running of the vehicle 10. The control routine of FIG. 3 is executed in the last trip of the vehicle 10, and the control routine of FIG. 4 is executed in the current trip of the vehicle 10. In the following description, the trip, in which the control routine of FIG. 3 is executed, is referred to as "last trip", so as to be distinguished from the current trip in which the control routine of FIG. 4 is executed. However, the "last trip" is the current trip when the control routine of FIG. 3 is being executed.

Each step of the control routine of FIG. 3 corresponds to function of the starting control portion 76. The control routine of FIG. 3, which is executed in the last trip to make the determination as to whether allowing the execution of the idle-stop control CTspid1 or not, is initiated with step S10 that is implemented to determine whether the low voltage battery 34 is in a good condition or not, depending on the engine-start voltage VLst and the state of charge SOC of the low voltage battery 34, for example, and to make the FIS determination that is to be used in the next trip. Step S10 is followed by step S20 that is implemented to determine whether the vehicle power has been placed into the IG-OFF state. When a negative determination is made at step S20, the control flow goes back to step S10. When am affirmative determination is made at step S20, step S30 is implemented to store the determination result (that was made at step S10) in a non-volatile memory or the like.

Each step of the control routine of FIG. 4 corresponds to function of the starting control portion 76. In the current trip, the smoothed ECU-voltage value VLse is repeatedly calculated to be updated, after the vehicle power is placed into the IG-ON state until the preparation period TRp is completed. The control routine of FIG. 4 is initiated with step S40 that is implemented to determine whether the execution of the pre-start-stage idle-stop control FIS is allowed or not in the FIS determination result that was stored in the last trip. When an affirmative determination is made at step S40, namely, when the above-described first condition is satisfied, step S50 is implemented to determine whether the low-voltage-battery temperature Thlowb is at least the predetermined temperature value THlowbf and the smoothed ECU-voltage value VLse is at least the predetermined voltage value VLsef. When an affirmative determination is made at step S50, namely, when the above-described second and third conditions are satisfied, step S60 is implemented to make the FIS determination that allows the execution of the pre-start-stage idle-stop control FIS and to place the FIS allowance flag into the ON state, whereby the determination (as to whether the execution of the idle-stop control CTspid1 is to be allowed or not) is completed. At this point, the S&S allowance flag is kept in the ON state. When a negative determination is made at step S40, or when a negative determination is made at step S50, the control flow goes to step S70 that is implemented to make the FIS determination that does not allow the execution of the pre-start-stage idle-stop control FIS and to place the FIS allowance flag into the OFF state. Further, at this step S70, the above-described first starter engine-start command is outputted. At this point, too, the S&S allowance flag is kept in the ON state. Step S70 is followed by step S80 that is implemented to determine whether the engine-start voltage VLst is at least the predetermined second voltage value VLstf or not. When an affirmative determination is made at step S80, step S90 is implemented to keep the S&S allowance flag in the ON state, whereby the determination (as to whether the execution of the idle-stop control CTspid1 is to be allowed or not) is completed. In this instance, the FIS allowance flag may be switched from the OFF state to the ON state. When a negative determination is made at step S80, the S&S determination that does not allow the execution of the post-start-stage idle-stop control S&S is made, and the S&S allowance flag is placed into the OFF state, whereby the determination (as to whether the execution of the idle-stop control CTspid1 is to be allowed or not) is completed.

As described above, in the present embodiment, the execution of the idle-stop control CTspid1 is allowed in the case in which the plurality of conditions are satisfied, wherein the plurality of conditions include (i) the first condition is that it is determined in the IG-ON state of the vehicle power that the execution of the idle-stop control CTspid1 is allowed in the result of the determination stored in the IG-OFF state of the vehicle power last time and (ii) the second condition that it is determined that the smoothed ECU-voltage value VLse is at least the predetermined voltage value VLsef. Thus, regardless of a length of a period from a point of time at which the vehicle power is placed into the IG-OFF state last time until a point of time at which the vehicle power is placed into the IG-ON state current time, the current condition of the low voltage battery 34 can be analogized from the smoothed ECU-voltage value VLse of the low voltage battery 34, in spite of possible discharge of the low voltage battery 34 during the above-described period. By combining the result of the determination using the smoothed ECU-voltage value VLse with the result of the determination stored in the IG-OFF state of the last time, it is possible to ensure accuracy of the determination as to whether the execution of the idle-stop control CTspid1 is to be allowed or not in the IG-ON state of the current time. It is therefore possible to suppress the execution of the idle-stop control CTspid1 from being erroneously allowed while suppressing loss of opportunity of the execution of the idle-stop control CTspid1. With the erroneous allowance of the execution of the idle-stop control CTspid1 being suppressed, it is possible to suppress difficulty of restarting the engine 12 during the execution of the idle-stop control CTspid1.

In the present embodiment, the execution of the idle-stop control CTspid1 is not allowed in the case in which at least one of the plurality of conditions is not satisfied, for example, in a case in which it is determined in the IG-ON state of the vehicle power that the execution of the idle-stop control CTspid1 is not allowed in the result of the determination stored in the IG-OFF state of the last time or in a case in which it is determined that the smoothed ECU-voltage value VLse is lower than the predetermined voltage value VLsef. It is therefore possible to suppress the erroneous allowance of the execution of the idle-stop control CTspid1.

Further, in this instance, the engine 12 is cranked with use of the starter motor 32, and the determination is made again as to whether the execution of the idle-stop control CTspid1 is to be allowed or not, depending on whether it is determined that the engine-start voltage VLst is at least the predetermined second voltage value VLstf. It is therefore possible to suppress loss of the opportunity of the execution of the idle-stop control CTspid1.

In the present embodiment, the execution of the pre-start-stage idle-stop control FIS is allowed in the case in which the plurality of conditions are satisfied, so that it is possible to suppress the execution of the pre-start-stage idle-stop control FIS from being erroneously allowed while suppressing loss of the opportunity of the execution of the pre-start-stage idle-stop control FIS. Further, the execution of the post-start-stage idle-stop control S&S is allowed, in the case in which the execution of the pre-start-stage idle-stop control FIS is not allowed and it is determined that the engine-start voltage VLst is at least the predetermined second voltage value VLstf, so that it is possible to suppress loss of the opportunity of the execution of the post-start-stage idle-stop control S&S.

In the present embodiment, the smoothing processing, which is executed for the DC/DC power supply voltage VLdc in the preparation period TRp, is initiated by setting the initial value of the smoothed ECU-voltage value VLse to the voltage value that is not lower than the open circuit voltage OCV of the low voltage battery 34. It is therefore possible to suppress the execution of the idle-stop control CTspid1 from being erroneously not allowed, for example, due to the inrush current caused by the capacitive components and voltage drop due to operations of various devices in the stage shortly after the power ON.

In the present embodiment, the plurality of conditions further include the third condition that it is determined in the IG-ON state of the vehicle power that the low-voltage-battery temperature THlowb is at least the predetermined temperature value THlowbf, so that the execution of the idle-stop control CTspid1 is allowed in a case in which the first through third conditions are all satisfied. Thus, by taking account of the low-voltage-battery temperature THlowb that could affect the outputtable electric power of the low voltage battery 34, it is possible to appropriately ensure the accuracy of the determination as to whether the execution of the idle-stop control CTspid1 is to be allowed or not in the IG-ON state of the current time.

While the preferred embodiment of this invention has been described in detail by reference to the drawings, it is to be understood that the invention may be otherwise embodied.

For example, in the control routine shown in the flow chart of FIG. 4 in the above-described embodiment, steps S70, S80 and S90 may not be provided where only the FIS determination is made without the S&S determination being made. Further, at step S50, the determination as to whether the low-voltage-battery temperature Thlowb is at least the predetermined temperature value THlowbf or not does not necessarily have to be made, as long as the determination as to whether the smoothed ECU-voltage value VLse is at least the predetermined voltage value VLsef or not is made. Thus, the control routine of FIG. 4 may be modified as needed.

In the above-described embodiment, the idle-stop control CTspid1 includes the post-start-stage idle-stop control S&S and the pre-start-stage idle-stop control FIS. However, where only the FIS determination is made without the S&S determination being made, the idle-stop control CTspid1 does not necessarily have to include the post-start-stage idle-stop control S&S as long as including the pre-start-stage idle-stop control FIS.

In the above-described embodiment, the vehicle 10 may be also a series-type hybrid electric vehicle, and does not necessarily have to include the automatic transmission 14. Further, the vehicle 10 does not necessarily have to include both of the first and second starting devices 16, 18, as long as including at least the second starting device 18. Where the vehicle 10 includes the second starting device 18 without the first starting device 16, the vehicle 10 does not necessarily have to include the DC/DC converter 20, as long as including equipment for charging the low voltage battery 34, such as a known alternator that is to be driven by the engine 12 to generate the electric power.

It is to be understood that the embodiment described above is given for illustrative purpose only, and that the present invention may be embodied with various modifications and improvements which may occur to those skilled in the art.

NOMENCLATURE OF ELEMENTS

10: vehicle
12: engine
18: second starting device (starting device)
32: starter motor (motor)
34: low voltage battery (power storage device)
70: electronic control apparatus (control apparatus)
76: starting control portion

What is claimed is:

1. A control apparatus for a vehicle that is provided with (a) an engine and (b) a starting device including a motor configured to rotate and drive the engine and a power storage device configured to supply an electric power to the motor, such that the starting device is configured to crank the engine by using the motor, the control apparatus comprising a starting control portion that is configured to make a determination as to whether allowing execution of an idle-stop control for temporarily stopping the engine, depending on whether it is determined that the power storage device is in a condition that guarantees start of the engine by cranking the engine by using the motor, and to store a result of the determination upon power OFF of the vehicle, wherein the starting control portion is configured to allow the execution of the idle-stop control, in a case in which a plurality of conditions are satisfied, such that the plurality of conditions include (i) a first condition is that it is determined upon power ON of the vehicle that the execution of the idle-stop control is allowed in the result of the determination stored upon the power OFF of the vehicle last time and (ii) a second condition that it is determined that a smoothed value of an output voltage of the power storage device is at least a predetermined voltage value that guarantees the start of the engine, the smoothed value being obtained by a smoothing processing for smoothing the output voltage during a preparation period from the power ON of the vehicle until elapse of a predetermined time for which an initialization processing of the control apparatus is executed.

2. The control apparatus according to claim 1,
wherein the starting control portion is configured to not allow the execution of the idle-stop control and to crank the engine by using the motor, in a case in which at least one of the plurality of conditions is not satisfied, and
wherein the starting control portion is configured to make the determination again as to whether allowing the execution of the idle-stop control, depending on whether it is determined that the output voltage of the power storage device upon cranking of the engine is at least a predetermined second voltage value that guarantees the start of the engine, the predetermined second voltage value being lower than the predetermined voltage value as a predetermined first voltage value.

3. The control apparatus according to claim 2,
wherein the idle-stop control includes a pre-start-stage idle-stop control executed to keep stopping the engine without starting the engine when the vehicle has not started to run after the power ON of the vehicle and a post-start-stage idle-stop control executed to temporarily stop the engine during running or stop of the vehicle,
wherein the starting control portion is configured to allow execution of the pre-start-stage idle-stop control, in the case in which the plurality of conditions are satisfied, and
wherein the starting control portion is configured to allow execution of the post-start-stage idle-stop control, in a case in which the execution of the pre-start-stage idle-stop control is not allowed and it is determined that the output voltage of the power storage device upon the cranking of the engine is at least the predetermined second voltage value.

4. The control apparatus according to claim 1,
wherein the starting control portion is configured to initiate the smoothing processing, by setting an initial value of the smoothed value to a voltage value that is not lower than an open circuit voltage of the power storage device.

5. The control apparatus according to claim 1,
wherein the plurality of conditions further include (iii) a third condition that it is determined upon the power ON of the vehicle that a temperature of the power storage device is at least a predetermined temperature value that guarantees the start of the engine.

6. The control apparatus according to claim 4,
wherein the smoothing processing is executed during the preparation period to calculate the smoothed value in each cycle, such that a latest value of the smoothed value is obtained by adding a division of a voltage difference by a smoothing ratio that is larger than one, to a previous value of the smoothed value, and such that the voltage difference is a difference of a latest value of the output voltage from the previous value of the smoothed value, and
wherein the second condition is satisfied in a case in which the latest value of the smoothed value upon the elapse of the predetermined time is at least the predetermined voltage value.

* * * * *